(12) United States Patent
Wang et al.

(10) Patent No.: US 11,739,865 B2
(45) Date of Patent: Aug. 29, 2023

(54) MOUNTING AND CATHODIC PROTECTION

(71) Applicant: BAKER HUGHES ENERGY TECHNOLOGY UK LIMITED, Bristol (GB)

(72) Inventors: Sui Wang, Newcastle (GB); Andrew Roberts, Ouston (GB); Laurence Baldwin, Brampton (GB)

(73) Assignee: BAKER HUGHES ENERGY TECHNOLOGY UK LIMITED, Bristol (GB)

( * ) Notice: Subject to any disclaimer, the term of this patent is extended or adjusted under 35 U.S.C. 154(b) by 268 days.

(21) Appl. No.: 16/484,598

(22) PCT Filed: Mar. 16, 2018

(86) PCT No.: PCT/GB2018/050681
§ 371 (c)(1),
(2) Date: Aug. 8, 2019

(87) PCT Pub. No.: WO2018/167504
PCT Pub. Date: Sep. 20, 2018

(65) Prior Publication Data
US 2020/0102658 A1    Apr. 2, 2020

(30) Foreign Application Priority Data

Mar. 16, 2017 (GB) .................................. 1704214
Mar. 16, 2017 (GB) .................................. 1704217

(51) Int. Cl.
*B21C 37/12* (2006.01)
*F16L 11/16* (2006.01)
(Continued)

(52) U.S. Cl.
CPC ............... *F16L 11/16* (2013.01); *C23F 13/08* (2013.01); *C23F 13/18* (2013.01); *F16L 11/08* (2013.01);
(Continued)

(58) Field of Classification Search
CPC ..... B21C 37/12; B21C 37/123; B21C 37/124; B21C 37/127; B21C 37/154; F16L 11/16;
(Continued)

(56) References Cited

U.S. PATENT DOCUMENTS 3,623,968 A * 11/1971 Bohne .................... C23F 13/10
204/196.15
3,994,794 A    11/1976 Bohne
(Continued)

FOREIGN PATENT DOCUMENTS

CN    202482437    10/2012
EP    0219472    4/1987
(Continued)

OTHER PUBLICATIONS

Translation FR 2088783 A5; Engelhard; Jan. 1972.*
(Continued)

*Primary Examiner* — Edward T Tolan
(74) *Attorney, Agent, or Firm* — Knobbe Martens Olson and Bear, LLP

(57) ABSTRACT

Methods and apparatus are disclosed. The apparatus includes a substantially cylindrical mount body (350) comprising a first open mouth at a first end of the cylindrical body (350) and a further open mouth at a remaining end of the cylindrical body, a substantially cylindrical inner surface, and an outer surface that includes a plurality of spaced apart substantially parallel recessed regions that extends circumferentially around the body, wherein the cylindrical
(Continued)

body (350) is tapered at each end and at least one securing element is located between the recessed regions.

8 Claims, 9 Drawing Sheets

(51) Int. Cl.
| | |
|---|---|
| *F16L 11/08* | (2006.01) |
| *F16L 11/127* | (2006.01) |
| *F16L 58/00* | (2006.01) |
| *H01B 7/00* | (2006.01) |
| *H01B 7/02* | (2006.01) |
| *H01B 7/04* | (2006.01) |
| *H01B 7/18* | (2006.01) |
| *H01B 7/22* | (2006.01) |
| *H01B 7/28* | (2006.01) |
| *H01B 13/00* | (2006.01) |
| *H01B 13/08* | (2006.01) |
| *H01B 13/26* | (2006.01) |
| *C23F 13/08* | (2006.01) |
| *H01B 7/282* | (2006.01) |
| *C23F 13/18* | (2006.01) |

(52) U.S. Cl.
CPC ........... *F16L 11/081* (2013.01); *F16L 11/083* (2013.01); *F16L 11/127* (2013.01); *F16L 58/00* (2013.01); *H01B 7/0018* (2013.01); *H01B 7/0241* (2013.01); *H01B 7/045* (2013.01); *H01B 7/1875* (2013.01); *H01B 7/226* (2013.01); *H01B 7/2806* (2013.01); *H01B 7/2825* (2013.01); *H01B 13/0036* (2013.01); *H01B 13/08* (2013.01); *H01B 13/26* (2013.01); *B21C 37/12* (2013.01); *C23F 2213/32* (2013.01)

(58) Field of Classification Search
CPC ..... F16L 11/24; F16L 58/00; Y10T 29/49362; Y10T 29/49435
See application file for complete search history.

(56) References Cited

U.S. PATENT DOCUMENTS

| | | | | |
|---|---|---|---|---|
| 3,994,795 | A * | 11/1976 | Kurr | C23F 13/10 |
| | | | | 204/196.16 |
| 4,040,447 | A * | 8/1977 | Scott | C23F 13/02 |
| | | | | 204/196.16 |
| 4,262,704 | A * | 4/1981 | Grawey | F16L 11/24 |
| | | | | 138/125 |
| 4,487,230 | A | 12/1984 | Anthony | |
| 4,706,713 | A | 11/1987 | Sadamitsu et al. | |
| 4,877,354 | A | 10/1989 | Williamson | |
| 5,294,396 | A | 3/1994 | Dressel et al. | |
| 6,012,495 | A | 1/2000 | Antonsen | |
| 6,062,270 | A * | 5/2000 | Hultberg | B21C 37/123 |
| | | | | 138/122 |
| 6,461,082 | B1 | 10/2002 | Smith | |
| 6,858,117 | B2 | 2/2005 | Berton et al. | |
| 7,055,551 | B2 | 6/2006 | Fraser et al. | |
| 9,383,056 | B2 * | 7/2016 | Clements | F16L 57/005 |
| 9,625,078 | B2 * | 4/2017 | Hesjevik | C23F 13/10 |
| 10,571,066 | B2 * | 2/2020 | Meijer | F16L 57/02 |
| 11,374,388 | B2 * | 6/2022 | Smith | H02G 1/10 |
| 2005/0115623 | A1 | 6/2005 | Coutarel et al. | |
| 2007/0227608 | A1 | 10/2007 | Dupoiron et al. | |
| 2009/0084459 | A1 | 4/2009 | Williams | |
| 2010/0089481 | A1 | 4/2010 | Bectarte et al. | |
| 2010/0266789 | A1 | 10/2010 | Conley et al. | |
| 2012/0193907 | A1 * | 8/2012 | Skarbovig | F16L 23/003 |
| | | | | 285/45 |
| 2012/0279577 | A1 | 11/2012 | Goering et al. | |
| 2013/0251457 | A1 | 9/2013 | Melymuk et al. | |
| 2013/0280973 | A1 | 10/2013 | Elder et al. | |
| 2014/0069542 | A1 | 3/2014 | Graham et al. | |
| 2014/0167346 | A1 | 6/2014 | IiJima | |
| 2015/0020910 | A1 * | 1/2015 | Pedersen | F16L 35/00 |
| | | | | 138/106 |
| 2016/0178106 | A1 | 6/2016 | Gleibol | |

FOREIGN PATENT DOCUMENTS

| | | | | |
|---|---|---|---|---|
| EP | 0219472 | A2 * | 4/1987 | ............. C23F 13/02 |
| EP | 2520839 | | 11/2012 | |
| FR | 2088783 | A5 * | 1/1972 | ............. F16L 58/00 |
| FR | 2286331 | A1 | 4/1976 | |
| GB | 2221225 | | 1/1990 | |
| GB | 2255104 | A | 10/1992 | |
| GB | 2398616 | A * | 8/2004 | ............. F16L 11/22 |
| GB | 2514785 | A | 12/2014 | |
| GB | 2521864 | | 7/2015 | |
| JP | 2014-50267 | A * | 3/2014 | ............. H02G 3/02 |
| WO | WO00/22336 | | 4/2000 | |
| WO | WO 02/39008 | | 5/2002 | |
| WO | WO2011/072688 | | 6/2011 | |
| WO | WO 2016/000716 | | 1/2016 | |
| WO | WO 2016/170360 | | 1/2016 | |
| WO | WO 2016/110617 | | 7/2016 | |

OTHER PUBLICATIONS

International Preliminary Report on Patentability for International Application No. PCT/GB2018/050681 dated Sep. 17, 2019.

Klust et al., "CO2 Corrosion Resistance of Steel Cord Reinforced Thermoplastic Materials For Flexible Pipe System", NACE International (2011).

International Search Report and the Written Opinion for International Application No. PCT/GB2018/050681 dated May 25, 2018.

UKIPO Search Report for Application No. GB 1704214.4 dated Sep. 8, 2017.

UKIPO Search Report for Application No. GB 1704217.7 dated Sep. 18, 2017.

* cited by examiner

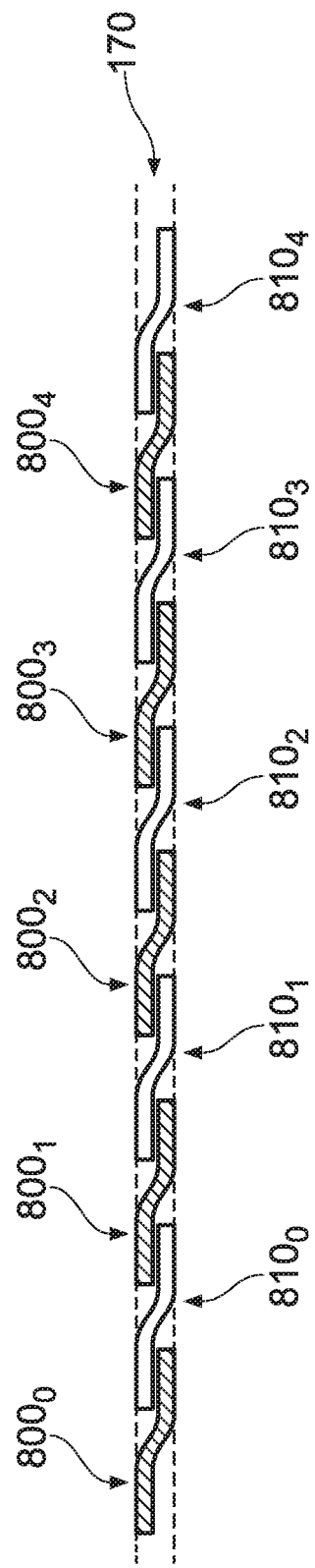

MOUNTING AND CATHODIC PROTECTION

The present invention relates to a method and apparatus for providing corrosion protection to a flexible pipe. In particular, but not exclusively, the present invention relates to the provision of one or more mounting points underneath an outer sheath of a flexible pipe to which anode elements of a cathodic protection system can subsequently be secured at desired locations remote from a pipe end fitting.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

It is known that an inner fluid retaining layer of a flexible pipe, often referred to as a liner or barrier layer, and an outer fluid retaining layer, referred to as an outer sheath, define between them an annulus region in which various metal structures may be located. For example such metal structures are tensile armour windings or pressure armour windings or the like. Furthermore it is known that if an outer sheath of a flexible pipe is breached in use or on installation ingress of seawater into the annulus region can lead to corrosion of the metallic parts. To prevent corrosion cathodic protection has been utilised. Cathodic protection is a mechanism for providing corrosion protection and such cathodic protection is well known to those skilled in the art. For example recommended practice DNV-RP-B401 or recommended practice DNV-RP-F103 provide guidelines for providing cathodic protection (CP) systems for submarine pipelines and flexible pipe risers. In summary such CP systems rely on the inclusion of metal anodes such as aluminium or zinc blocks which are less noble and thus have a lower reference potential than the metallic regions of a flexible pipe which are to be protected. At a point of contact where an anode is located the flexible pipe metals, such as steel windings, will have the potential of the anode. This potential gradually increases along a length of flexible pipe body away from the anode. The change in potential is caused by attenuation effects due to the resistance of the structure of the metal elements as well as other factors.

Because of these well known attenuation effects, and the fact that anodes used as part of a CP system have conventionally been mounted to end fittings of a flexible pipe, an effective length of flexible pipe body between next adjacent end fittings has been limited. Effectively more end fittings have conventionally been utilised than desired in order to provide anodes, fitted to the end fittings, at a required level of frequency along a pipeline. This requirement to include "extra" end fittings along a flexible pipe has conventionally increased cost and complexity associated with the provision of a subsea pipeline and/or riser.

It is also known that from time to time it is desirable to be able to attach ancillary equipment to a flexible pipe at desired locations along a length of the flexible pipe on installation or during use. A wide variety of ancillary equipment could in theory be needed. For example, buoyancy modules, bend restrictors, anode clamps, riser clamps, stiffener elements or the like. Conventional techniques for mounting such equipment are limited and often rely upon attachment of such ancillary equipment to a rigid end fitting at an end of a pipe. Alternatively certain conventional techniques require complex and costly and difficult to install securing mechanisms which additionally may provide a risk to proper functioning of a flexible pipe.

It is an aim of certain embodiments of the present invention to at least partly mitigate the above-mentioned problems.

It is an aim of certain embodiments of the present invention to provide one or more mount points for a CP system along a length of flexible pipe body when that flexible pipe body is manufactured.

It is an aim of certain embodiments of the present invention to provide a method and apparatus for enabling one or more anodes to be connected to a flexible pipe at desired locations remote from the end fitting.

It is an aim of certain embodiments of the present invention to provide a mechanism for obviating attenuation effects from a cathodic protection system along a length of flexible pipe.

It is an aim of certain embodiments of the present invention to enable cathodic anodes to be secured to an outer sheath of a flexible pipe at locations well away from distant end fittings.

It is an aim of certain embodiments of the present invention to enable ancillary equipment, such as anode clamps or stiffener elements or bend restrictor elements or buoyancy modules or riser clamps or a heater modules or the like, to selectively be secured to flexible pipe body.

It is an aim of certain embodiments of the present invention to provide an electrical connection between layers of a flexible pipe which include metallic components.

It is an aim of certain embodiments of the present invention to provide an anti-fretting layer between opposed layers of a flexible pipe which thus provides a stand off to the opposed layers but which also helps maintain metallic parts in the spaced apart layers in electrical connection.

It is an aim of certain embodiments of the present invention to reduce attenuation effects along a length of flexible pipe body.

According to a first aspect of the present invention there is provided apparatus for mounting a corrosion protection element of a corrosion protection system to an outer surface region of flexible pipe body, comprising a substantially cylindrical mount body comprising a first open mouth at a first end of the cylindrical body and a further open mouth at a remaining end of the cylindrical body, a substantially cylindrical inner surface, and an outer surface that includes a plurality of spaced apart substantially parallel recessed regions that extends circumferentially around the body; wherein the cylindrical body is tapered at each end and at least one securing element is located between the recessed regions.

Aptly the inner surface of the mount body has an inner diameter that is substantially equal to an outer surface diameter provided by an outer tensile armour layer of the flexible pipe body.

Aptly a thickness of the body between the inner surface and the outer surface, where the outer surface is not recessed or tapered, is less than 1 cm.

Aptly the thickness is less than 0.5 cm.

Aptly the cylindrical body comprises a plurality of body portions, each body portion providing a respective section of the cylindrical body.

Aptly each securing element comprises a threaded hole in the cylindrical body.

Aptly the threaded hole is a blind hole or a through hole.

Aptly the apparatus further comprises a respective circular seal element located in each recessed region.

Aptly at least a region of the cylindrical mount body is electrically conducted.

Aptly said a region of the cylindrical mount body comprises a whole of the mount body.

Aptly said a region is formed from a metallic material.

Aptly the cylindrical mount body comprises an anode mounting collar.

According to a second aspect of the present invention there is provided a method of manufacturing flexible pipe body, comprising steps of:
providing a tensile armour wire layer by helically winding a tensile armour wire over an underlying layer;
providing at least one substantially cylindrical mount body, comprising a spaced apart first and further open mouth at respective ends of the mount body and a substantially cylindrical inner surface and at least one securing element between a plurality of spaced apart recessed regions in an outer surface, over the tensile armour wire layer; and
providing an outer sheath over the mount body and the tensile armour layer.

Aptly the method further comprises providing the mount body over the tensile armour wire layer by locating at least two mating mount body portions over the tensile armour wire layer.

Aptly the method further comprises securing the mount body portions together to form the substantially cylindrical mount body.

Aptly the method further comprises wrapping a tape layer over and/or under the tensile armour wire layer and said mount body.

Aptly the method further comprises providing a mark or marks on an outer surface of the outer sheath at a respective location associated with a securing element of the cylindrical mount body.

Aptly the method further comprises providing the cylindrical mount body over the outer surface of the tensile armour layer whereby the mount body makes an interference fit with the outer surface of the tensile armour layer.

Aptly the method further comprises providing the mount body in one or more body portions, at least one body portion comprising a metal region.

Aptly the method further comprises providing the mount body in a plurality of body portions each wholly manufactured from a metallic material.

According to a third aspect of the present invention there is provided a method of securing an anode to a flexible pipe, comprising the steps of:
determining a location along a region of flexible pipe body where a cylindrical mount body, comprising a spaced apart first and further open mouth at respective ends of the mount body and a substantially cylindrical inner surface and a plurality of spaced apart recessed regions in an outer surface, is located;
securing an anode or anode clamp element to the mount body by locating a securing element, located between the recessed regions, through an outer sheath of the flexible pipe body.

Aptly the method further comprises clamping the anode or anode clamp element to the outer sheath on opposed sides of a location where the securing element is located through the outer sheath.

Aptly the method further comprises, via the clamping step, urging outer sheath material into the spaced apart recessed regions of the cylindrical mount body, thereby providing a fluid seal on a first and remaining side of the securing element.

Certain embodiments of the present invention provide a convenient to use mounting mechanism which is inbuilt into flexible pipe body as the flexible pipe body is manufactured. Subsequently, as desired, an anode mount and anodes or other such ancillary equipment can be selectively mounted to the outside of the flexible pipe body at desired locations.

Certain embodiments of the present invention provide an anode mount (or other ancillary equipment or ancillary equipment mount) to which one or more anode elements can be secured in use and which provides the additional effect of maintaining integrity of an "anti-birdcage system". That is to say the mount has an inner surface which is substantially cylindrical or otherwise profiled to provide support to underlying tensile armour wire layers. The tensile armour layers where the mount is not located can be supported via a conventional technique, for example by utilising tape windings.

Certain embodiments of the present invention provide a method and apparatus for enabling an anode mount for anodes of a CP system to be secured to flexible pipe body at considerable distances away from any end fitting. As a result longer lengths of flexible pipe body can be utilised without recourse to a back-to-back end fitting arrangement than would otherwise be needed using conventional techniques.

Certain embodiments of the present invention provide a connecting point for anodes and an anode mount on a pipe outer sheath without the requirement for a mid-line connection.

Certain embodiments of the present invention provide a mounting point outside a tensile layer to make effective contact with a protected area. Aptly the mounting point can provide a sealing surface for an outer sheath to maintain outer sheath integrity. Aptly the mounting point provides a constraint for the underneath tensile wires to maintain birdcage performance.

Certain embodiments of the present invention provide a method of effectively electrically connecting metallic elements from multiple layers in flexible pipe body together. As a result resistance along a length of flexible pipe is reduced thus reducing attenuation effects.

Certain embodiments of the present invention provide an anti-fretting layer that can be used between opposed layer in flexible pipe body and which also includes one or more electrically conducting elements which bridge the space between the separated layers to help provide an electrical connection at repeated locations along the length of flexible pipe body.

Certain embodiments of the present invention will now be described hereinafter, by way of example only, with reference to the accompanying drawings in which.

Figure 4A:
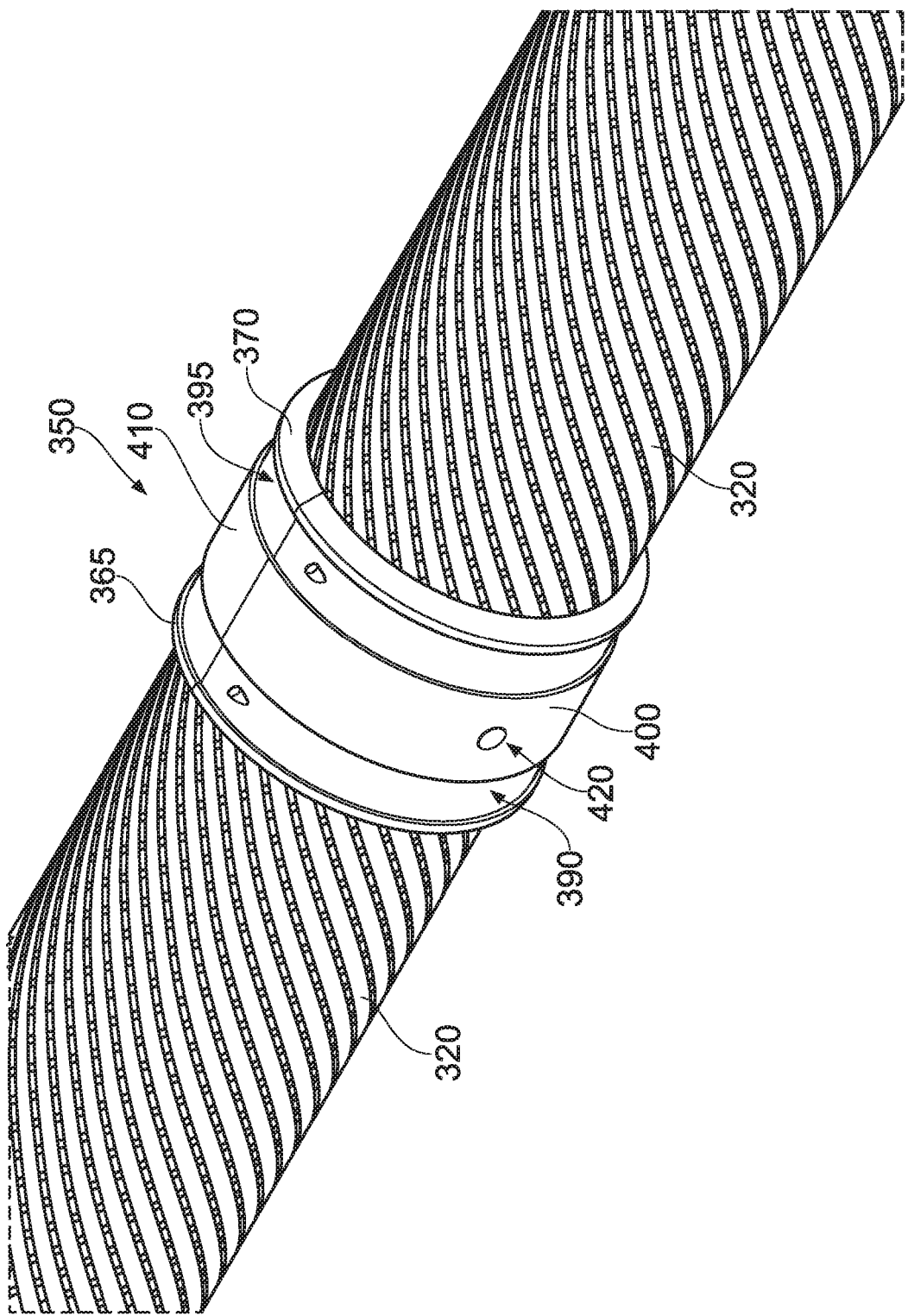
Figure 4B:
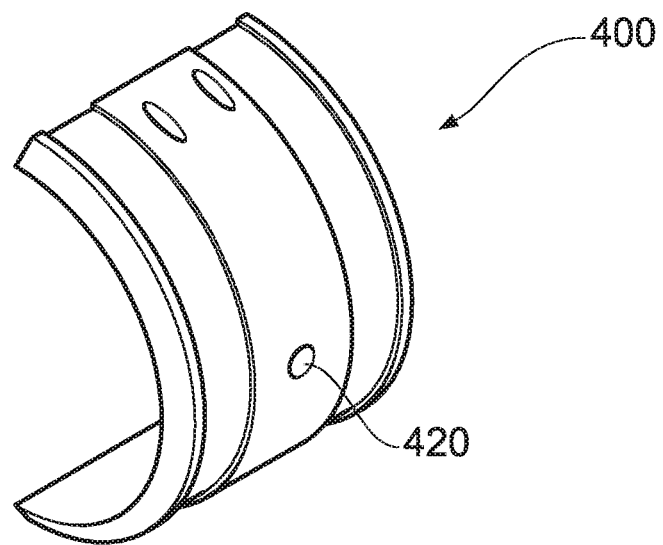
Figure 5:
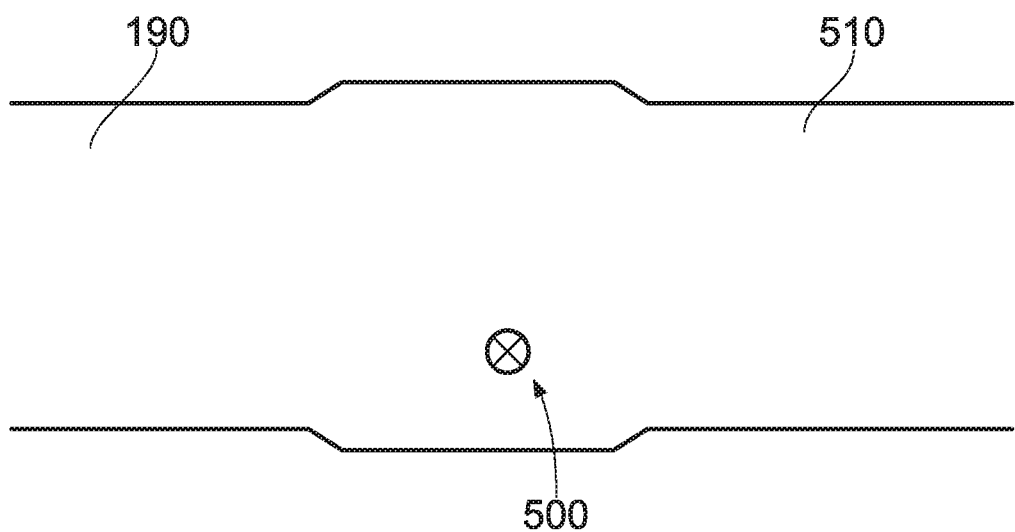
Figure 6:
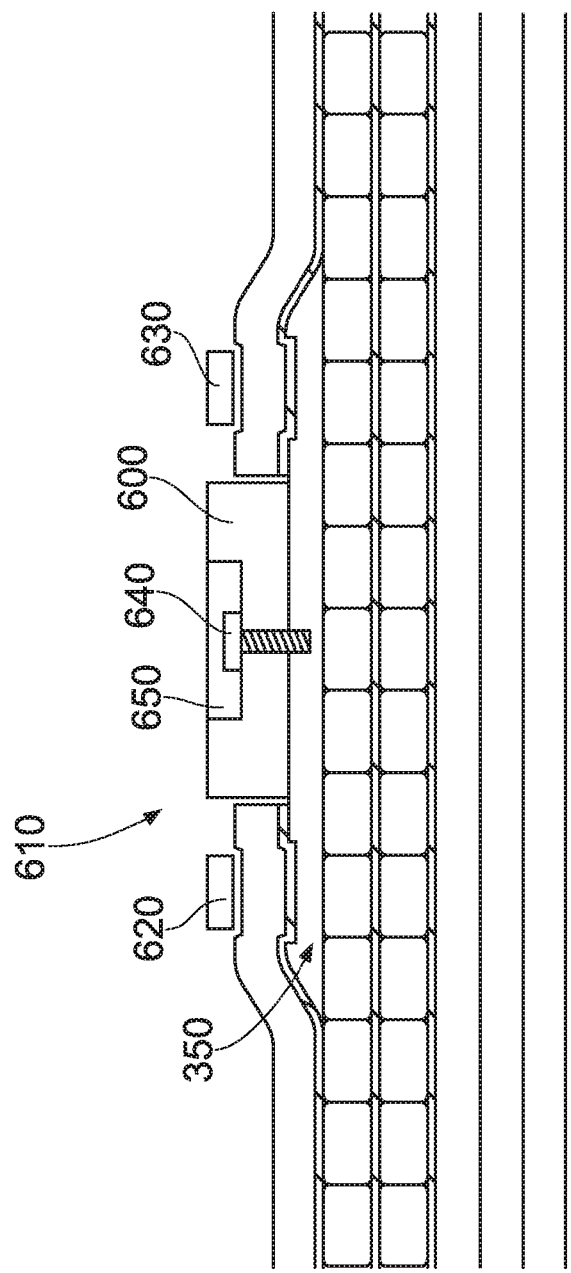

FIGS. 4A and 4B help illustrate apparatus for mounting a corrosion protection element over an outer surface of a tensile armour layer;

FIG. 5 illustrates an indicator showing a location of a fastening/securing point;

FIG. 6 illustrates an anode clamp secured to the flexible pipe body.

Figure 7:
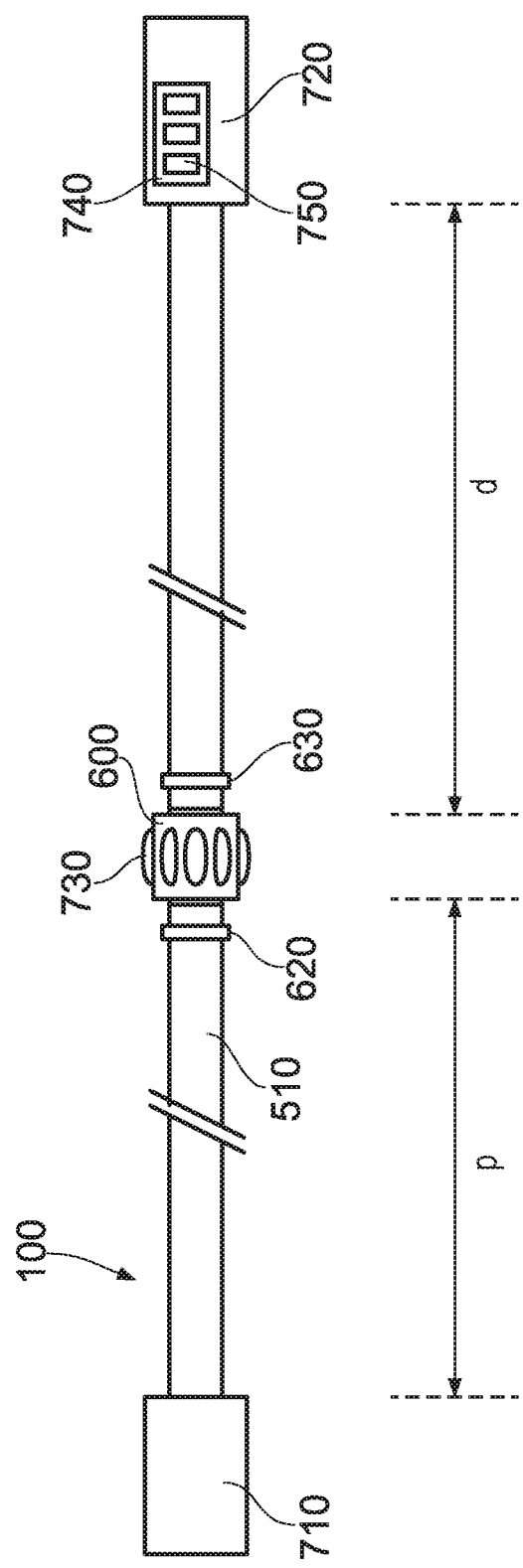

FIG. 7 illustrates a flexible pipe with cathodic protection provided by anodes mounted on an anode mount a great distance from opposed end fittings of the flexible pipe; and FIG. 8 illustrates an intermediate layer provided by both electronically conducting and electrically insulating tapes.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Other embodiments are associated with other types of flexible pipe.

Figure 1:
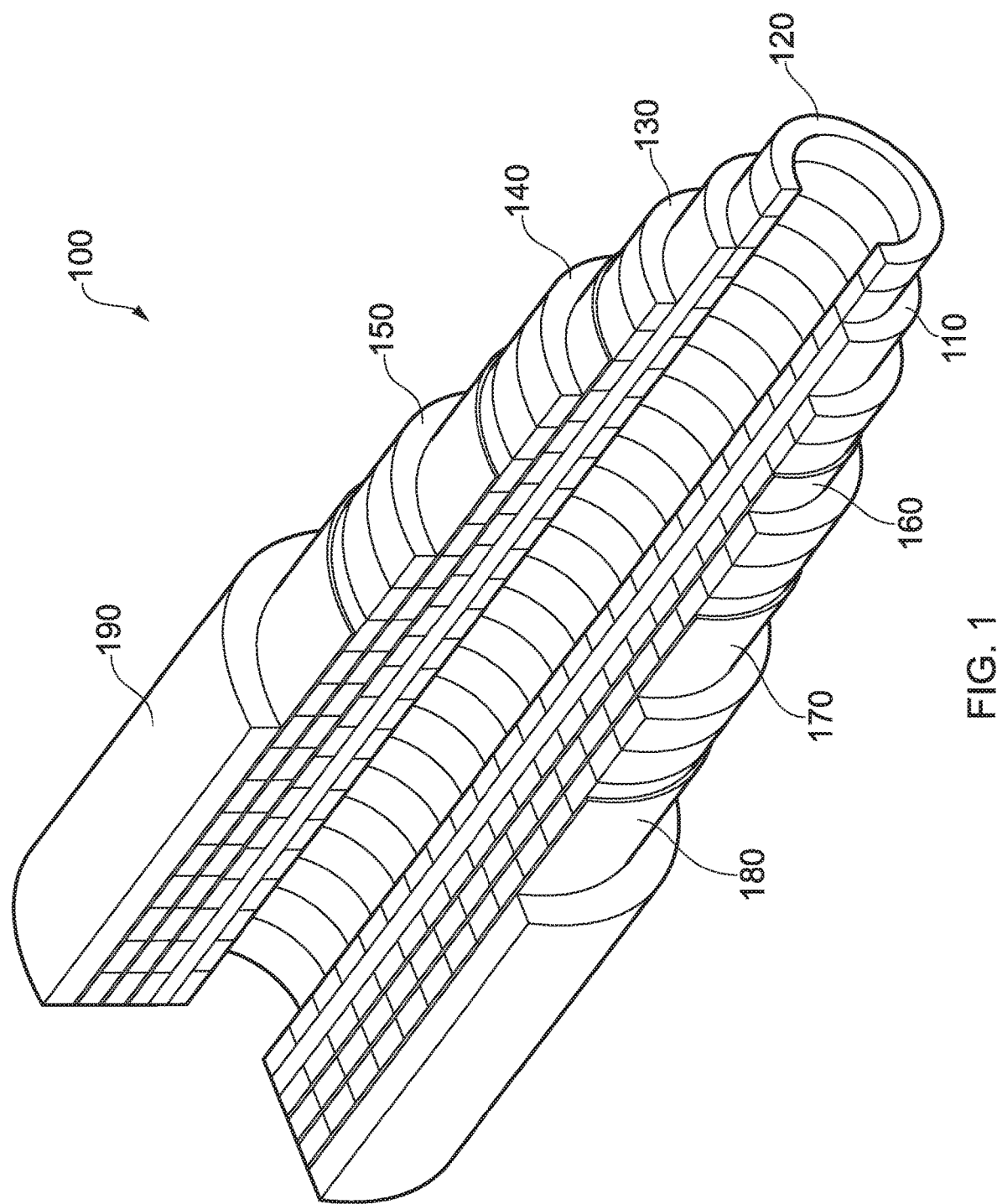
FIG. 1 illustrates flexible pipe body.

Turning to FIG. 1 it will be understood that the illustrated flexible pipe is an assembly of a portion of pipe body and one or more end fittings (not shown in FIG. 1) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

A pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly the lay angle is between 80° and 90° to the axis of the pipe body. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition or winding, followed by consolidation. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160, 170, 180 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation and/or metal winding or polymer layers or tape layers or layers including special materials such as optical fibres and an outer sheath 190, which comprises a polymer layer used to protect the pipe against penetration of seawater and other external environments, corrosion, abrasion and mechanical damage. Any thermal insulation layer helps limit heat loss through the pipe wall to the surrounding environment and may comprise layers of tape or at least one extruded layer of insulating material.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
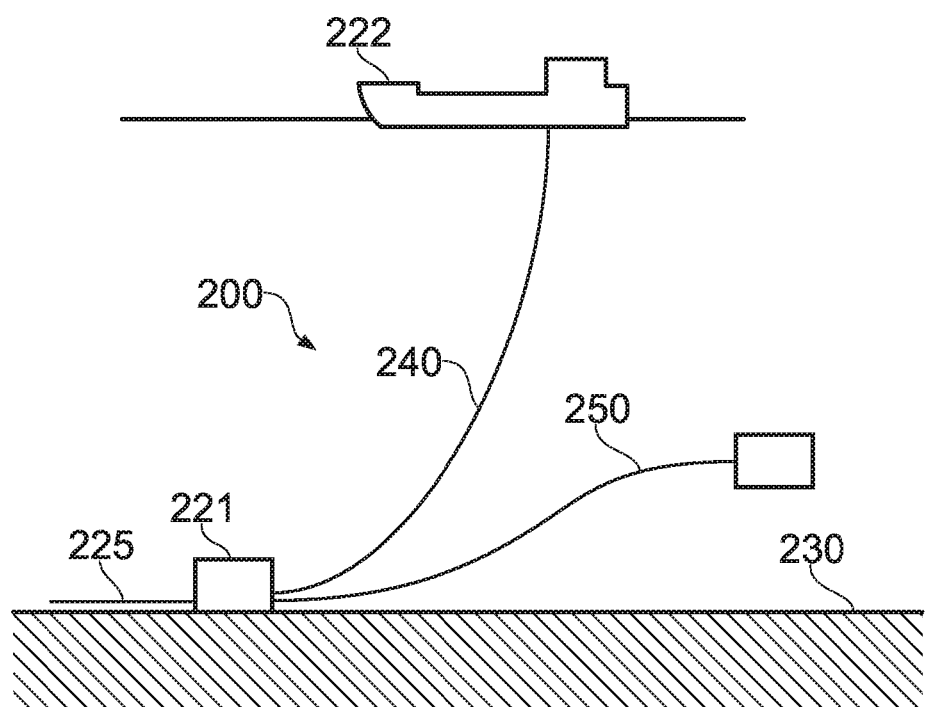
FIG. 2 illustrates uses of flexible pipe incorporating the flexible pipe body.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
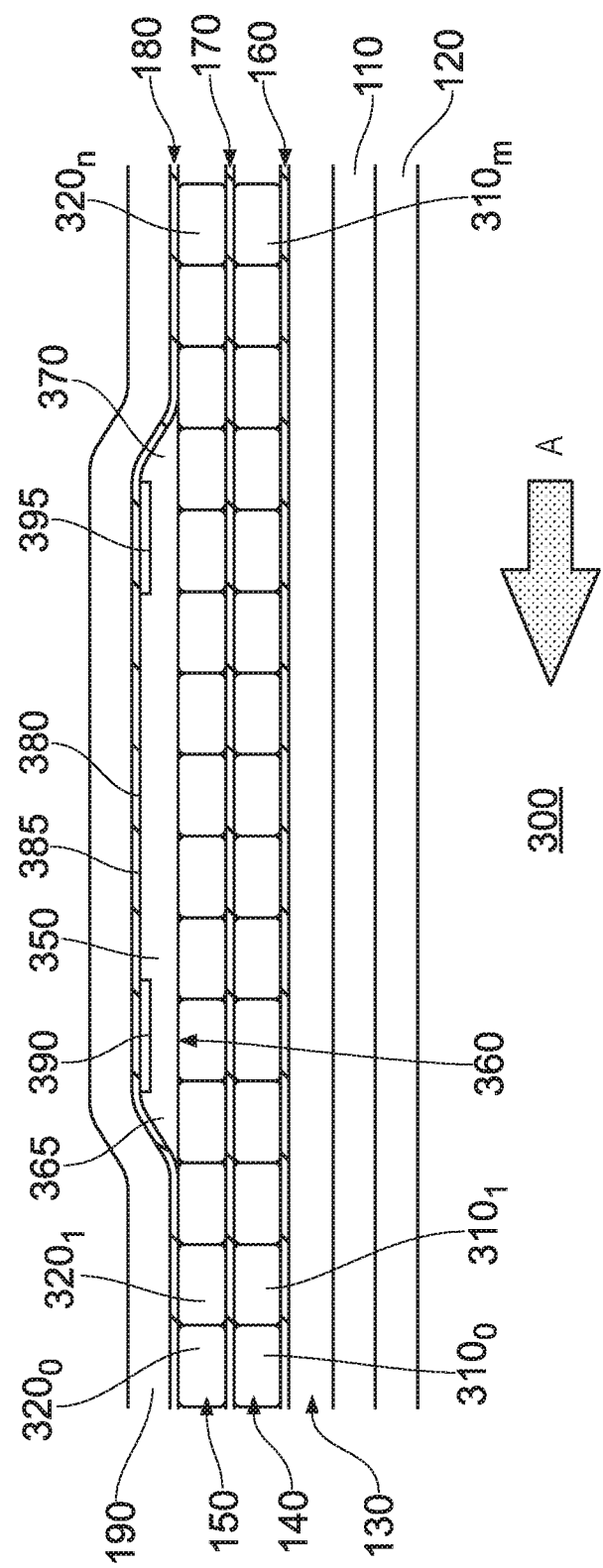
FIG. 3 illustrates a cross section along a length of flexible pipe body.

FIG. 3 illustrates a cross section through a short length of the flexible pipe body 100 shown in FIG. 1 in more detail. As shown in FIG. 3 a carcass layer 120 supports a barrier layer 110. An inner surface of the barrier layer 110 provides the fluid retaining surface which defines a bore region 300 along which transport of production fluids can take place. The direction of flow of the production fluid is illustrated by arrow A in FIG. 3 although it will be appreciated that the flexible pipe may be utilised in different directions.

An innermost tape layer 160 is located on a radially outermost surface of the pressure armour layer 130 to help support windings of the pressure armour layer. This innermost tape layer 160 also helps provide anti-fretting effects between the inner/underlying pressure armour layer 130 and windings of the first tensile armour layer 140. Adjacent windings $310_{0, 1 \ldots m}$ of tensile armour wire of the first tensile armour layer are illustrated in FIG. 3. The innermost tape layer 160 is an intermediate layer between a pressure armour layer 130 and an inner tensile armour layer 140.

A further tape layer 170 is an intermediate layer between the first tensile armour layer 140 and the second tensile armour 150. Adjacent windings $320_{0, 1 \ldots n}$ of the second tensile armour wire provide the outer tensile armour layer 150.

A further tape layer 180 is wound outside the second tensile armour layer 150. This helps provide support and anti-birdcaging effects to the tensile armour layer/s. The outer sheath 190 is formed outside the outer tape layer 180. This further tape layer 180 is an intermediate layer between the outer tensile armour layer (and mount body) and an overlying layer.

Also illustrated in FIG. 3 is a substantially cylindrical mount body 350 which is provided over the outermost tensile armour layer 150. A radially innermost surface 360 of the mount body 350 is substantially cylindrical and smooth (it could alternatively be selectively profiled) and has an inner dimension sized to provide an interference fit with the outer surface of the windings $320_{0, 1 \ldots n}$ of the radially outermost tensile armour layer 150. The mount body 350 has a tapered first end 365 at a downstream end of the mount body 350 and a further tapered end 370 spaced apart from the first end at an upstream end of the mount body. It will be appreciated that the mount body 350 may be provided in either orientation (facing an expected flow or facing with the flow).

A radially outermost surface 380 of the mount body is provided and includes the radially outer surface of the two tapered ends 365, 370, a substantially cylindrical central region 385 and a first recessed region 390 at a downstream end of the mount body 350 and a further recessed region 395 at an upstream end of the mount body.

FIGS. 4A and 4B help illustrate the mount body 350 located over the outer surface of the outermost tensile armour layer 150 during manufacture of flexible pipe body. As illustrated in FIG. 4A the mount body 350 is a substantially cylindrical member which has a first open mouth at a first end of the cylindrical body and further open mouth at a remaining end of the cylindrical body. As illustrated in FIG. 4A the mount body is provided in two substantially C-shaped body parts 400, 410. When the two C-shaped parts are put together a ring-like or bracelet-like member is formed. The multiple portions of the body can be placed together subsequent to the outer tensile armour layer 150 being manufactured and secured in place. Aptly the C-shaped (or other shaped) parts are screwed together or secured via self adhesive tape. Alternatively the mount body may be a single integral piece slid along the tensile armour layer or alternatively may be formed from more than two mount body portions.

Also shown in FIGS. 4A and 4B is a blind hole 420 in one of the mount body parts 400. This is a threaded hole which has an end terminating within the body of the first portion 400 of the mount body 350. A similar blind hole 430 may optionally be provided in the remaining mount body part 410. Each threaded blind hole provides a securing element which is useable subsequent to completion of the manufacture of the flexible pipe body to enable ancillary equipment such as an anode clamp, stiffener element or buoyancy module or the like to be secured to the flexible pipe body prior to installation or subsequent to installation. It will be appreciated that the threaded hole could be a threaded throughhole or other securing mechanism that mates with another securing element of the ancillary equipment in use.

Figure 4B:
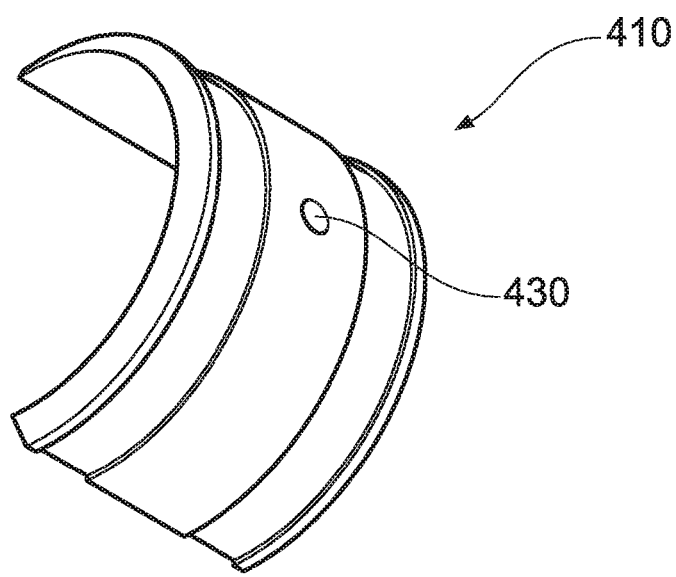

FIG. 4 also helps illustrate how the spaced apart recessed regions 390, 395 of the mount body each provide a substantially cylindrical outer surface. The two thus provided surfaces are spaced apart and substantially parallel. More than two spaced apart recessed regions could optionally be utilised. FIG. 4B helps illustrate how the inner surface of the mount body can be smooth.

The mount body 350 illustrated in FIG. 4 has a thickness of about around 0.7 cm in the central region between the spaced apart recesses 390, 395. Aptly as an alternative the mount body has a thickness of between 5 and 20 mm. Aptly the thickness is about around 10 mm.

The mount body 350 has a thickness which makes the mount body rigid enough to not deform in use. Furthermore the thickness is sufficiently thick taking into account the material used to enable any ancillary equipment to be secured to the mount body in use. Aptly the mount body portions are each formed from a common material. Aptly the mount body portions are manufactured from possible materials include, but are not limited to, steel, iron, copper, aluminium, titanium, magnesium, zinc alloy and/or other electrically conductive materials. Carbon fibre composite or other composite materials that are electrically conductive could also be utilised.

The mount body 350 shown has an axial length of around 70 to 150 mm. Aptly the axial length is around 100 mm.

It will be appreciated that the mount body 350 is located over the outermost tensile armour layer 150 during manufacture of the flexible pipe body. Thereafter an outer "anti-birdcaging" tape layer 180 can be wound over the outer surface of the tensile armour layer 150 and over the mount body 350. Alternatively the tape layer may be terminated/started on either side of the mount body 350. The mount body may also comprise one or more teeth or other clamping elements for clamping onto the edges of a terminated tape layer 180. This helps secure the tape/s in the tape layer as well as achieving a good conductive contact with the armour layer 150. Thereafter the outer sheath 190 and any optional intervening further layers, such as insulating layers, can be formed.

FIG. 5 helps illustrate a region of the flexible pipe body where the bracelet-like mount body is located under the outer sheath 190. The outer surface of the pipe body is shown swollen in an exaggerated way in the Figure to help understanding. FIG. 5 helps illustrate how an indicator 500 can be provided on an outer surface 510 of the outer sheath to help provide subsequent users with a guide as to a location of each securing element of the mount body. It will be appreciated that a wide variety of indictors could be utilised. For example a single mark may be made or multiple marks giving guidance as to the securing element location can be utilised. The mark or marks may optionally be coloured. A circled cross is shown in FIG. 5. Aptly the indicator is a stamped region in the outer surface 510 of the outer sheath 190. It will be appreciated that if the bracelet-like mount body includes multiple fastening points then an indicator for each fastening point may be provided. Alternatively a single indicator can be provided providing a subsequent user knows of a distribution scheme for each fastening point of the mount body so they only need to identify one valid position It will be appreciated that whilst the mount body shown in FIGS. 3 and 4 are shown at a single location along a length of flexible pipe body multiple similar mount bodies each separated from one another by a common or optionally different distance may be provided at selected locations along a length of flexible pipe body as it is manufactured. Thereafter when the flexible pipe body, as part of a flexible pipe, is installed at a work site as a flow line or riser or the like ancillary equipment such as an anode clamp can be secured to the outside of the flexible pipe using one or more of the mount bodies. As a result a very convenient mounting mechanism is inbuilt into flexible pipe body at the point of manufacture for subsequent optional use. The securing process can be permanent or replaceable in the sense that ancillary equipment may be permanently fastened to the mount body or may be fastened and then removed and replaced by other ancillary equipment including optionally a sealing "blank".

FIG. 6 illustrates the mounting point provided by the mount body 350 shown in FIGS. 3 and 4 in more detail but with ancillary equipment in the form of an anode clamp, useable as a mount for anode elements, secured to the mount body. As illustrated in FIG. 6 in order to secure the anode clamp 600 to the mount body 350 an aperture 610 is cut at a location identified by the indicator 500. The aperture 610 has a size determined by a size of the anode clamp 600 to be secured to the mount body. It will be appreciated that whilst the ancillary equipment shown in FIG. 6 as an anode clamp should be in electrical connection to the mount body, different types of ancillary equipment may optionally be connected to the mount body without forming an overlarge aperture in the outer sheath. Rather a body part of the ancillary equipment may merely be urged against an outer surface 510 of the outer sheath and then one or more securing elements such as bolts selected to mate with the securing element 420 in a mount body can be driven through the outer sheath. For example the ancillary equipment may be secured using bolts which pass through small apertures made in the outer sheath and screwed into the threaded blind hole 420 of the mount body. Metal bolts thus provide an electrical connection between the mount body and the anode clamp. The outer sheath in such circumstances can act as a stand off. Additional sealing O-rings or the like may be utilised between the ancillary equipment and the outer sheath to help provide a seal around the aperture/s. This helps prevent seawater ingress into the annulus of the pipe body.

Turning again to FIG. 6 the aperture 610 is cut through the outer sheath to have a size and shape configured to coincide with a size and shape of the anode clamp 600. The aperture is made not only through the outer sheath but also through the outer tape layer 180. Alternatively if the outer tape layer 180 includes electrically conducting elements (see discussion later) the anode clamp 600 may rest on an outer surface of that tape layer.

FIG. 6 helps illustrate how a downstream clip 620 and an upstream clip 630 may be wrapped around the outer sheath and tightened to drive the outer sheath material and tape layer into respective recessed regions 390, 395. Each clip 620, 630 is a ring like element which can be tightened to consolidate outer sheath material and tape layer material into a respective recess. As a result a liquid tight seal can be provided on adjacent sides of the anode clamp to help prevent ingress of seawater into the annulus region provided between an inner surface of the outer sheath and a radially outer surface of the barrier layer. The recessed regions 390, 395 may also comprise a saw-tooth or similar profile in order to help sealing against the outer sheath material.

FIG. 6 helps illustrate how a bolt 640 can be located in a recess 650 in the anode clamp 600 and can be driven to secure into the blind threaded hole 420 in the mount body thus securing the anode clamp 600 to the mount body. It will be appreciated that multiple bolts distributed around the circumference of the anode clamp could be utilised. The securing process draws the anode clamp into close contact with the mount body.

In the case of the ancillary equipment being an anode clamp, as previously discussed, the anode clamp 600 makes an electrical connection to the metallic mount body 350, or optionally to just at least a region of the mount body that is electrically conductive, and through the mount body to the outermost tensile armour windings. As a result cathodic protection can be provided to the outer most tensile amour wire windings by attaching anode blocks to the anode clamp 600. If each intermediate tape layer is electrically conductive (see later) the anode blocks are thus electrically connected to many metal layers.

FIG. 7 helps illustrate a flexible pipe which includes a segment of flexible pipe body 100 with a first end fitting 710 at a first respective end of the flexible pipe body and a further end fitting 720 at a remaining end of the flexible pipe body. The flexible pipe shown in FIG. 7 is an elongate structure which can in practice have a length of many kilometres between the end fittings. Anode blocks 730 are illustrated secured circumferentially around the anode clamp 600. As illustrated in FIG. 7 the location of the anode blocks 730 is shown a considerable distance away from any end fitting. It will be appreciated that end fittings could additionally or optionally utilise anode blocks in addition to the anode blocks 730 and anode clamps 600 and mounting mechanism previously described. The anode clamp 600 and anode block 730 can thus be provided distal to (or indeed proximate to if desired) any end fitting. Aptly the mount points and anode clamps are more than 2 kilometres from any end fitting. Aptly the anode blocks and associated mount are more than one kilometre from any end fitting. Aptly the distances p and d shown in FIG. 7 are both greater than 1 km. The distances p and d can be the same or different.

FIG. 7 also helps illustrate how a conventional anode clamp 740 may be secured to an end fitting 720 and multiple anode blocks 750 (three shown in FIG. 7 secured via the clamp to the end fitting. Such an anode clamp 740 and anodes 750 provide CP to a region proximate to the end of the flexible pipe body near the end fitting 720. It will be appreciated that if desired similar anode clamps and anode blocks could optionally be additionally secured to the remaining end fitting 710.

Cathodic protection can thus be provided to a flexible pipe via anode elements mounted to end fittings and/or to anode elements secured in a mid-line location but without needing back-to-back end fittings.

FIG. 8 helps illustrate an intermediate tape layer 170 in more detail. It will be appreciated that the further intermediate tape layers 160, 180 could be similarly provided. As illustrated in FIG. 8 the tape layer is a relatively thin layer formed by winding thin, long, substantially flat, strips helically around an underlying layer. Optionally the elongate strips of tape can be an electrically insulating material and are used to provide anti-fretting properties (preventing adjacent metallic layers from rubbing against each other). Alternatively, as illustrated in FIG. 8, an intermediate tape layer can be formed by winding two different strips each having different characteristics. In FIG. 8 an electrically insulating tape formed by polypropylene or the like is wound over an underlying layer (in the example shown in FIG. 8 over the innermost tensile armour layer 140). The tape is thin and flexible so that adjacent windings $800_{0, 1 \ldots 4}$ of tape overlap and curve. Windings $810_{0, 1 \ldots 4}$ of a further strip-like tape are illustrated in FIG. 8. These are formed from a metallic material such as steel or the like. Other electrically conducting materials such as, but not limited to, copper, aluminium, nickel, gold or silver foil or tapes comprising alloys of these or comprising other conductive materials such as graphene or the like could optionally be utilised. The electrically insulating windings and electrically conductive windings are interposed. In this way the tape layer provides a combination of cheap and flexible anti-fretting characteristics together with an electrically conductive pathway which electrically connects an underlying layer such as a metallic underlayer with an overlying layer such as a metallic overlayer (for example a first tensile armour layer 140 can be electrically connected to a second tensile armour layer 150). As a result the windings of an overlying layer and the windings of an underlying layer are electrically interconnected via an intermediate layer. As a result a net electrical resistance offered by any metallic layer which extends along a length of the flexible pipe body is reduced. As a result attenuation effects otherwise expected with CP systems are significantly reduced. As a result a frequency of anode elements that are needed along a length of flexible body is reduced relative to conventional techniques.

An intermediate tape layer which includes electrically conducting elements and electrically insulating elements enables a variety of materials to be used and makes use of material characteristics to the best of those materials ability. For example electrically insulating materials can be utilised which provide superior anti-fretting and/or support capabilities. Additionally a material that is highly electrically conductive can be utilised and distributed as a winding throughout the intermediate layer to provide a bridge forming an electrical connection between otherwise spaced apart layers. By electrically connecting opposed layers together an electrical resistance per unit length of the flexible pipe body is much reduced relative to conventional techniques and thus attenuation effects can be reduced. As a result anode elements are needed less frequently along a length of flexible pipe body than would otherwise be needed according to conventional techniques to provide a desired level of cathodic protection. It will be appreciated that whilst the intermediate layer shown in FIG. 8 includes an electrically insulating tape wound adjacent to, and sequentially alternating with, an electrically conductive tape it is possible according to certain embodiments of the present invention to utilise multiple insulating tape windings with a single electrically insulating tape winding or vice versa depending upon desire.

Aptly the tapes are wound helically around an underlying layer using a winding station that rotates with one or more sources of tape feeding the insulating tape/s and electrically conducting tape/s to respective touchdown points. Those touchdown points enable each continuous elongate tape to be simultaneously wound albeit at offset positions circumferentially and/or longitudinally. In this way immediately next windings of a different tape can have a 0-90% overlap with an immediately preceding winding (which may be of the same or different tape type). Aptly there is at least a partial overlap of the tape windings.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing flexible pipe body, comprising steps of:
providing a tensile armour wire layer by helically winding a tensile armour wire over an underlying layer;
providing at least one substantially cylindrical mount body, comprising a spaced apart first and further open mouth at respective ends of the mount body and a substantially cylindrical inner surface and at least one securing element between a plurality of spaced apart recessed regions in an outer surface, over the tensile armour wire layer; and
providing an outer sheath as an outer fluid retaining layer over the mount body and the tensile armour layer.

2. The method as claimed in claim 1, further comprising; providing the mount body over the tensile armour wire layer by locating at least two mating mount body portions over the tensile armour wire layer.

3. The method as claimed in claim 2, further comprising: securing the mount body portions together to form the substantially cylindrical mount body.

4. The method as claimed in claim 1, further comprising: wrapping a tape layer over and/or under the tensile armour wire layer and said mount body.

5. The method as claimed in claim 1, further comprising: providing a mark or marks on an outer surface of the outer sheath at a respective location associated with a securing element of the cylindrical mount body.

6. The method as claimed in claim 1, further comprising: providing the cylindrical mount body over the outer surface of the tensile armour layer whereby the mount body makes an interference fit with the outer surface of the tensile armour layer.

7. The method as claimed is in claim 1 further comprising: providing the mount body in one or more body portions, at least one body portion comprising a metal region.

8. The method as claimed in claim 7, further comprising providing the mount body in a plurality of body portions each wholly manufactured from a metallic material.

* * * * *